Dec. 15, 1953  J. A. STEDMAN  2,662,296

DEPTH GAUGE

Filed Dec. 3, 1952

INVENTOR.
James A. Stedman
BY
Nathaniel Frucht
ATTORNEY

Patented Dec. 15, 1953

2,662,296

UNITED STATES PATENT OFFICE 2,662,296

DEPTH GAUGE

James A. Stedman, Cranston, R. I., assignor to Central Tool Company, a partnership Application December 3, 1952, Serial No. 323,744

2 Claims. (Cl. 33—172)

The present invention relates to measuring devices, and has particular reference to a novel construction for a depth gage.

The standard types of depth gage include a micrometer vernier arrangement for measuring the extension of a manually movable depth rod, the micrometer having a base which bridges over the opening of a blind hole or recess into which the depth rod is extended. The accuracy of the measurement is dependent on delicacy of the touch response of the operator and may be several thousandths off.

The principle object of the invention is to provide a depth gage with mechanism to indicate when the depth rod has made contact with the bottom of the blind hole.

A further object of the invention is to provide a visual indicator for disclosing when the depth rod has touched bottom.

Another object is to provide a simple accurate multiplying mechanism which has a substantial movement of a depth indicator for a small terminal movement of the depth rod.

With the above and other objects and advantageous features in view, the invention consists of a novel arrangement of parts more fully disclosed in the detailed description following, in conjunction with the accompanying drawings, and more specifically defined in the claims appended thereto.

Figures 1, 2:
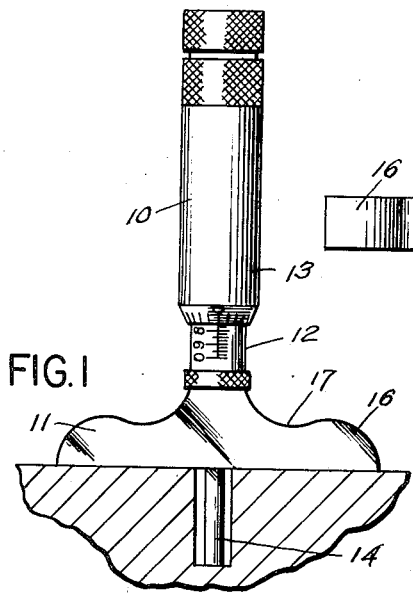
Fig. 1 is a side view of an illustrative depth micrometer embodying the invention, a work piece with blind hole being indicated in section.
Fig. 2 is a top plan view of the depth micrometer of Fig. 1.
Figure 3:
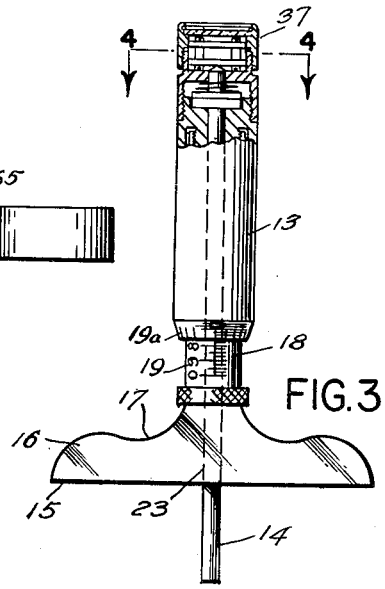
Fig. 3 is a view similar to Fig. 1, parts being broken away.
Figure 4:
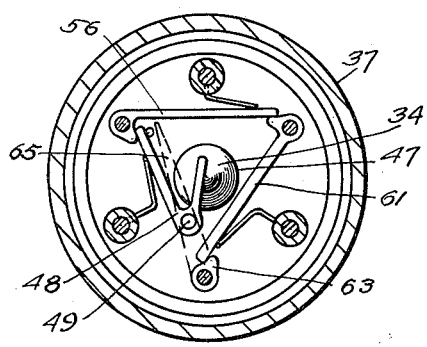
Fig. 4 is an enlarged section on the line 4—4 of Fig. 3.

It has been found desirable to provide a depth gage with an indicator for disclosing when the depth rod has touched the bottom of a blind hole. To this end, I mount the depth rod in the thimble to permit a small amount of play, and I position an indicator on the thimble which moves upon upward movement of the depth rod when it first contacts the bottom of a blind hole or recess, and which points to a guide mark when the depth rod play has been taken up, whereby the depth indicated on the barrel is the true depth, without variation caused by the sensitiveness of touch of the operator.

Referring to the drawings, the depth gage 10 has the usual elongated base or cross piece 11, barrel 12, thimble 13, and movable depth rod 14. The base 11 has a flat lower surface 15 and a curved upper surface 16 with depressed portions 17 for receiving the fingers of the operator. The barrel 12 is secured to the cross piece, and is of standard tubular type, the outer cylindrical surface 18 being provided with calibrations 19 along its length, and the inner surface having screw threads 20. The thimble 13 is of the concentric depending sleeve type, with an outer shell 21 extending over the barrel, and an inner shell 22 extending within the barrel and externally threaded to engage the barrel threads, whereby rotation of the thimble moves the thimble linearly on the barrel, the outer thimble shell having calibrations 19a at its lower end to cooperate with the barrel calibrations for disclosing the extent of linear movement of the thimble. The depth rod 14 is slidably mounted in the thimble and extends through a central longitudinal bore 23 thereof and through an aligned bore 23a in the cross piece, to move linearly with the thimble, as hereinafter described.

Figure 5:
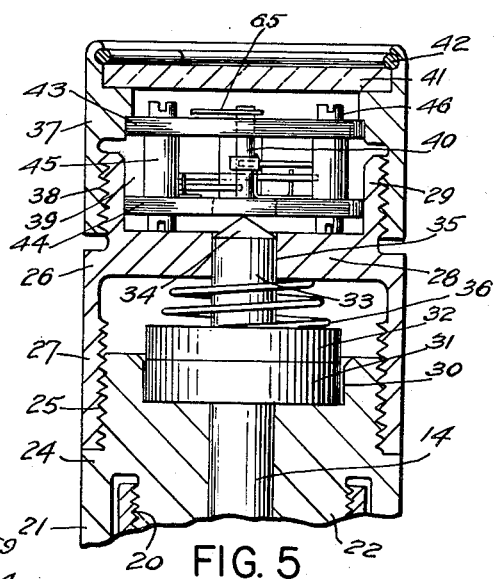
Fig. 5 is an enlarged detail of the upper end of Fig. 3.

Referring now to Fig. 5, the upper end 24 of the thimble 13 is annularly recessed and threaded as indicated at 25 to receive a closure 26 having a depending externally knurled and internally threaded flange 27 engaging the thimble recess 25, a transverse diaphragm 28, and an upstanding flange 29 of reduced diameter and externally threaded. The upper thimble end 24 has a central recess 30 to receive the annular head 31 of the depth rod 14, and the recess 30 is of sufficient depth to also seat the cylindrical base 32 of an upstanding pin 33 which has a conical end 34 and is freely movable through a central bore 35 in the transverse diaphragm 28, a spiral spring 36 around the pin 33 with its ends engaging the lower surface of the diaphragm 28 and the upper surface of the pin base 32 normally urging the pin 33 and the depth rod 14 downwardly.

A knurled cap 37 is internally threaded as indicated at 38 to seat over the upper end of the closure 26, and provides a chamber 39 which houses a multiplying mechanism 40, the upper end of the cap being recessed and swaged over to receive a glass plate 41 and a lock ring 42 as illustrated.

Figure 6:
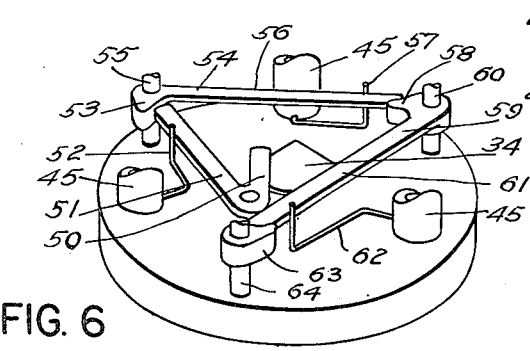
Fig. 6 is a perspective detail of the multiplying mechanism.

The multiplying mechanism 40 includes an upper plate 43 and a lower plate 44 held in spaced relation by three tubular supports 45, internally threaded to receive lock studs 46 extending through the plates 43 and 44. The lower plate 44 has a central opening 47 through which the upper conical pin end 34 may move. A bent lever 48 of V shape is pivotally mounted on a stud 49 secured to the lower plate 44, with a short arm 50 of the lever extending over the central opening 47, whereby upward movement of the pin end 34 will swing the lever 48 to the left, as shown in Fig. 6. The other arm 51 of the lever, which is of greater length and is normally pressed inwardly by a spring finger 52 secured to one tubular support 45, is adapted to engage the short arm 53 of a second lever 54, pivotally mounted on a stud 55 secured to the lower plate 44, the long arm 56 of the second lever 54 also being spring pressed inwardly by a spring finger 57 secured to the second tubular support 45.

The long arm 56 of the second lever 54 is adapted to engage the short arm 58 of a third lever 59, pivotally mounted on a lower plate stud 60, the long arm 61 of the third lever 59 also being spring pressed inwardly by a spring finger 62 secured to the third tubular support 45, and being adapted to engage a cam 63 locked to a stud 64 rotatably mounted on the lower plate 44 and extending through the upper plate 43 and carrying a pointer 65 at its upper end.

It follows, therefore, that upward movement of the depth rod through the cross piece and thimble will move the pin 33 upwardly against its spring 34, and will cause a deflection of the lever 48 which is multiplied to produce a large movement of the pointer 65, to thus disclose the extent of the play between the rod and the thimble. The gage is calibrated to a zero reading by setting the lower end of the depth rod flush with the lower surface of the cross piece, and then marking the position of the pointer, as by an arrow 66, see Fig. 2. When the depth rod touches bottom, and the thimble is turned to bring the pointer 65 to its arrow 66, there is no rod play and the reading is then exact, with no plus or minus variations due to the delicacy of touch of the operator.

Although I have disclosed a specific embodiment of the invention, it is obvious that the invention may be applied to other length measurement gages, and that changes in the shape, size and arrangement of the parts, and in their operation and function, may be made to meet the requirements for different measuring instruments, without departing from the spirit and the scope of the invention as defined in the appended claims.

I claim:

1. In a depth gage, an internally threaded barrel, a cross piece mounted on the lower end of the barrel, a rotatable thimble having an outer shell extending over the barrel and an inner shell threadedly engaging the barrel threads, said barrel and thimble having cooperating calibrations; the thimble inner shell having a central longitudinal bore and the cross piece having a bore in alignment with the inner shell bore, the upper end of the thimble having a central recess of greater diameter than the thimble inner bore, a depth rod slidably mounted in said aligned bores and having a head slidably seated in said recess, a cap at the upper end of the thimble providing a chamber, a multiplying mechanism in said chamber including a movable pointer, spring means normally pressing said depth rod downwardly, and means actuating the multiplying means on upward movement of the depth rod.

2. In a depth gage, an internally threaded barrel, a cross piece mounted on the lower end of the barrel, a rotatable thimble having an outer shell extending over the barrel and an inner shell threadedly engaging the barrel threads, said barrel and thimble having cooperating calibrations; the thimble inner shell having a central longitudinal bore and the cross piece having a bore in alignment with the inner shell bore, the upper end of the thimble having a central recess of greater diameter than the thimble inner bore, a depth rod slidably mounted in said aligned bores and having a head slidably seated in said recess, a cap at the upper end of the thimble providing a chamber, a multiplying mechanism in said chamber including a movable pointer, an upstanding pin having a cylindrical base seated on the depth rod head, and spring means normally engaging said pin base to press said depth rod downwardly, said pin having a conical end engaging said multiplying mechanism, whereby upward movement of the depth rod actuates the multiplying mechanism to rotate the pointer.

JAMES A. STEDMAN.

References Cited in the file of this patent

UNITED STATES PATENTS

| Number | Name | Date |
|---|---|---|
| 1,317,746 | Whatley | Oct. 7, 1919 |
| 2,344,595 | Calow | Mar. 21, 1944 |